(12) United States Patent
Iida et al.

(10) Patent No.: US 6,637,400 B2
(45) Date of Patent: Oct. 28, 2003

(54) INTERNAL COMBUSTION ENGINE CONNECTING ROD

(75) Inventors: Zenji Iida, Wako (JP); Yasunori Satou, Wako (JP); Shigeru Suzuki, Wako (JP); Teruaki Midorikawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/088,510
(22) PCT Filed: May 30, 2001
(86) PCT No.: PCT/JP01/04558
§ 371 (c)(1),
(2), (4) Date: Apr. 12, 2002
(87) PCT Pub. No.: WO02/12739
PCT Pub. Date: Feb. 14, 2002

(65) Prior Publication Data
US 2002/0148434 A1 Oct. 17, 2002

(51) Int. Cl.⁷ .............................................. F02B 75/32
(52) U.S. Cl. ...................................................... 123/197.3
(58) Field of Search .......................... 123/197.3, 197.4, 123/197.2, 197.1, 195 R; 74/579 E

(56) References Cited

U.S. PATENT DOCUMENTS 3,705,753 A * 12/1972 Bierlein et al. ............. 384/288

FOREIGN PATENT DOCUMENTS

| JP | 7-119731 | 5/1995 |
| JP | 9-144759 | 6/1997 |
| JP | 10-131969 | 5/1998 |

* cited by examiner

Primary Examiner—Henry C. Yuen
Assistant Examiner—Hyder Ali
(74) Attorney, Agent, or Firm—Arent Fox Kintner Plotkin & Kahn, PLLC

(57) ABSTRACT

An internal combustion engine connecting rod capable of preventing rotation or relative slippage of a slide metal piece even if the nail of the slide metal piece is not abutted. An internal combustion engine connecting rod comprising a hole in the end of the connecting rod main body, the end being divided into a plurality of parts circumferentially of the hole, and a slide metal piece (10) disposed on the inner peripheral surface of the hole, wherein the inner peripheral surface of the hole is provided with slits (L, L') extending in one direction at an angle of 13–90° with respect to the circumferential direction.

6 Claims, 8 Drawing Sheets

Fig.13A
CONVENTIONAL ART
Fig.13B
CONVENTIONAL ART
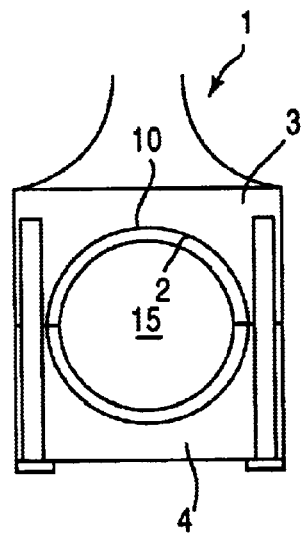
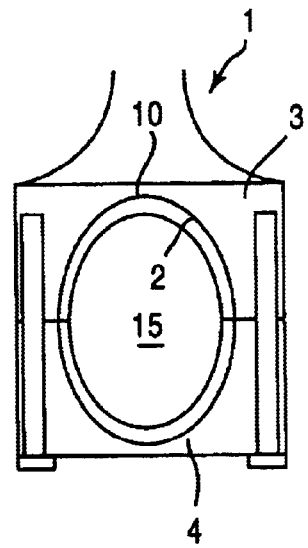
Fig.13C
CONVENTIONAL ART
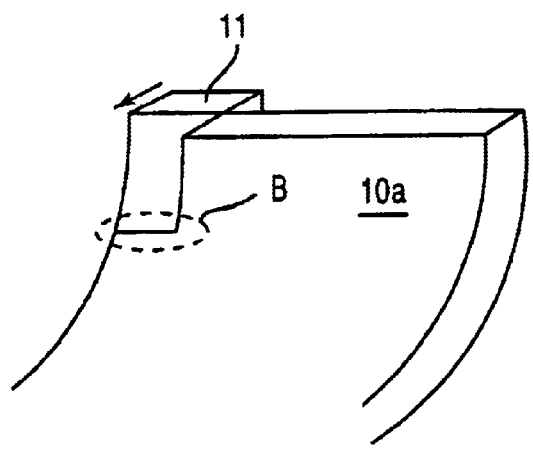

INTERNAL COMBUSTION ENGINE CONNECTING ROD

TECHNICAL FIELD

The present invention relates to an internal combustion engine connecting rod whose end is divided and disposed circumferentially with respect to a hole formed therein, and which has a slide metal piece mounted in the hole. More particularly, the invention relates to a technique for preventing relative rotation of the slide metal piece with respect to the hole.

BACKGROUND ART

FIG. 10A is a perspective view showing a large end of the main body of the internal combustion engine connecting rod (referred to simply as "connecting rod" hereinafter) having the structure described above. A hole 2 is formed in the center of the large end 1. The large end 1 is divided into a rod portion 3 and a cap portion 4 which are disposed as two semi-circles in the longitudinal direction of the hole 2, and the rod portion 3 and the cap portion 4 are mounted with bolts which are not shown in the drawing. At an inner periphery of one mating surface vicinity of the rod portion 3 and the cap portion 4, as shown in an enlarged view in FIG. 10B, grooves 5 which are in the circumferential direction and which gradually deepen until the mating surface is reached, are formed so as to be on different sides from each other, and such that the mating surface is disposed therebetween. The slide metal piece 10 shown in FIG. 11 is mounted in the hole 2 of the connecting rod body having the structure described above.

As shown in FIG. 11A, the slide metal piece 10 comprises two ring halves 10a and 10b obtained by dividing the ring. At one mating portion of the ring halves 10a and 10b, nails 11 which extend from the outer periphery side are formed so as to be opposite to each other. The slide metal piece 10 is fit into the hole 2 by the nails 11 being accommodated in the grooves 5 of the connecting rods, and the slide metal piece is mounted into the hole 2 with a fixed tightness by tightening the bolts. Furthermore, relative movement of the slide metal piece 10 is prevented by the end surfaces of the nails 11 which are accommodated in the grooves 5, being caused to abut the end surface of the rod portion 3 or the cap portion 4.

In this invention, the rod portion 3 and the cap portion 4 are formed separately by sintering, forging, casting or the like, but they may also be formed integrally. In the case where the rod portion 3 and the cap portion 4 are formed integrally, the connecting rod may be formed first, and then the hole and the grooves are mechanically machined. The rod portion and the cap portion are then divided by being split so as to break, and thus have a similar structure to that described above, and then the slide metal piece is mounted. In this case, the machining of grooves like those shown in FIG. 10B is difficult. As a result, as shown by the broken lines in the same drawing, the connecting rod is machined to form grooves which straddle the rod portion 3 and the cap portion 4. Furthermore, for both the embodiment having the rod portion 3 and the cap portion 4 formed separately, and for that having the integral structure, which was divided by being mechanically machined and then carrying out a breaking-split, the slide metal piece may be mounted without providing grooves for fixing the slide metal piece.

FIG. 12A is a cross sectional view showing the breaking-split type connecting rod described above in a state in which the crank pin 15 is mounted. Because the nail 11 of the slide metal piece 10 does not abut the end surface inside the groove 5, as shown in FIG. 12B, the slide metal piece 10 may rotate due to deformation of the large end 1 caused by load being exerted on the connecting rod. In addition, by being deformed from the unloaded state in FIG. 13A, to the state in FIG. 13B in which the large end was deformed in the longitudinal direction thereof, as shown in FIG. 13C, the nail 11 is pressed in the direction of the arrow and there is a danger that the base plate B will eventually breaking due to fatigue. Also, broken pieces from the nail 11 may become caught between the crank pin 15 and the slide metal piece 10, and in the worst case, the slide metal piece 10 and the crank pin 15 may heat up.

In addition, as shown in FIG. 14A, a slide metal piece 10 having no nail may also be used. In this case, it is easier for the large end to deform due to load applied to the connecting rod than in the case described above in which the slide metal piece is provided with nails. As shown in FIG. 14A, crush relief portions 20 are formed at both ends of the ring halves 10a and 10b which comprise the slide metal piece 10. The crush relief portion 20 is formed such that its thickness decreases as the end thereof is approached, by causing the diameter of the inner peripheral surface to gradually increase as the end is approached. As shown in FIG. 14B, in the connecting rod in which the rod portion 3 and the cap portion 4 are separately formed, when these two portions are mounted, the joint surface may be slid. In this case, the crush relief portions 20 prevent localized contact between the slide metal piece 10 and the crank pin 15.

Furthermore, if the crush height (the height of the slide metal piece which projects from the hole in the large end in an unloaded state) is excessive, due to the elastic deformation of the mating portion of the ring halves 10a and 10b, the crush height portion distends toward the inner side, and the effective inner diameter of the shaft receiving metal piece is decreased. In that case also, the crush relief portion 20 functions to prevent localized contact between the slide metal piece 10 and the crank pin 15.

However, when the slide metal piece 10 rotates for the above described reason, the crush relief portion 20 is not able to function to prevent the localized contact between the slide metal piece 10 and the crank pin 15. That is to say, the crush relief portion 20 functions to prevent localized contact between the slide metal piece 10 and the crank pin 15 along the direction of the joint surface of the rod portion 3 and the cap portion 4. Accordingly, when as shown in FIG. 14C, the slide metal piece 10 rotates and the phase is slid, the portion which is slid and distends towards the inner side becomes close to the crank pin 15 side, and thus there is localized contact between the sliding portion and the crank pin 15. Furthermore, when the large end 1 in an unloaded state shown in FIG. 13A is deformed in the longitudinal direction so as to be in the state shown in the FIG. 13B, localized contact is more intense, and this may cause great damage to the inner peripheral surface of the slide metal piece 10.

Furthermore, this problem is common to all configurations of the slide metal piece, and due to deformation and the like of the large end caused by load being applied to the connecting rod, relative micro slippage of the slide metal piece and the hole in the large end with respect to each other is caused. Thus, fretting is generated when the outer peripheral surface of the slide metal piece and the inner peripheral surface of the hole contact. That is to say, when the large end 1 deforms in the longitudinal direction as shown in FIG. 13B, because the deformation of the hole 2 of the large end 1 of the slide metal piece 10 is not in exactly the same manner, relative micro slippage of the slide metal piece 10 and the hole 2 with respect to each other is caused. In addition wear dust, generated due to fretting, accumulates between the slide metal piece 10 and the crank pin 15, and this damages the slide surface. Also, minute cracks caused by fretting at the inner surface of the hole 2 develop, and in the worst case, there is the danger that the connecting rod will be damaged.

Thus, an object of the present invention is to provide a connecting rod in which rotation and relative slippage of the slide metal piece is restricted, and the problems described above are eliminated.

DISCLOSURE OF THE INVENTION

The present invention is a connecting rod comprising a hole in the end of the connecting rod main body, the end being divided into a plurality of parts which are in a circumferential direction with respect to the hole and a slide member is disposed on the inner peripheral surface of the hole, wherein the inner peripheral surface of the hole is provided with slits which extend in one direction at an angle of 13 to 90° with respect to the circumferential direction.

In the connecting rod having the above described structure, slits are provided at a predetermined angle in a circumferential direction with respect to the inner peripheral surface of an end of the connecting rod main body. As a result, frictional resistance of the slide member is increased due to the unevenness of the slits, and relative rotation of the slide member is restricted. The slits may be formed by a polishing process such honing, grinding with a grindstone, or by carrying out shaving using a bite, or with a rotating tool such as a drill, a reamer, an end mill or the like. Furthermore, by adjusting the conveying speed and the rotation speed of the tool when the process is being carried out, the angle of the slits with respect to the circumferential direction of the hole can be set at 13 to 90°. It is to be noted that for making the angle of the slits 90°, broaching, for example, may be carried out. However, in the case of the rotation processing, if consideration is given to processability, it is preferable that the slit angle does not exceed 35°.

When the slits are to be formed, by passing the tool through the hole in one direction thereof one time, or alternatively a number of times, slits can be formed which extend in one direction (linear slitting). In the present invention, the tool such as the grindstone, the bite and the like, may also be inserted from the direction opposite to the direction referred to above to form slits which cross the slits which were first formed (cross slitting). That is to say, the present invention is a connecting rod comprising a hole in the end of the connecting rod main body, the end being divided into a plurality of parts which are in a circumferential direction with respect to the hole and a slide member is disposed on the inner peripheral surface of the hole, wherein the inner peripheral surface of the hole is provided with slits which extend in one direction at an angle of 17 to 90° with respect to the circumferential direction and also with slits that extend in a direction which crosses the one direction. It is to be noted that, in the case of cross slitting, the slits will form a net meshing and thus there is some reduction in frictional resistance. For this reason, it is necessary to set the angle so as to be larger in the case of cross slitting than in the case of linear slitting.

BRIEF DESCRIPTION OF THE DRAWINGS

FIG. 13A is side view showing the connecting rod, FIG. 13B shows the state in which the connecting rod shown in FIG. 13A has been deformed in the longitudinal direction thereof, and FIG. 13C is a perspective view for describing the load received by the nail of the slide metal piece.

BEST MODE FOR CARRYING OUT THE INVENTION

Figure 1A:
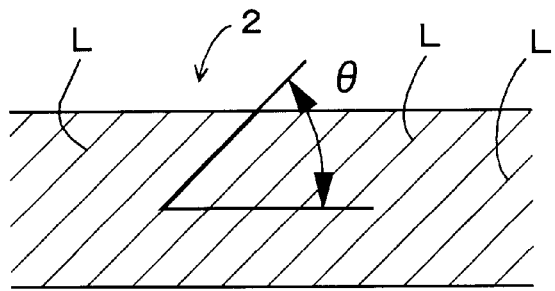
FIGS. 1A and 1B show the inner peripheral surface of the slide metal piece of an embodiment of the present invention.

The following is a description of an embodiment of the present invention referring to FIG. 1. FIG. 1A is an unfolded plane view of the inner peripheral surface of the hole 2 formed in the large end of the connecting rod. The transverse direction in these figures is the circumferential direction. On the inner peripheral surface of the hole 2, slits L are formed by linear slitting, at an angle θ in the circumferential direction. The slits L are lines of unevenness caused by using a tool such as a honing grindstone for example, to mechanically process the material surface. The angle θ of the slits L in the circumferential direction is set at 13 to 90° by the adjustment of the rotation speed and the conveying speed of the tool.

Figure 1B:
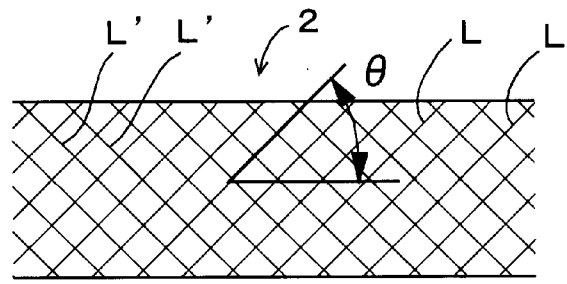

FIG. 1B shows the hole 2 having slits L formed, wherein slitting is carried out by a tool being conveyed in the direction opposite to that in which it was conveyed in FIG. 1A, thus forming slits L' which cross the slits L. In this case in which cross slitting is carried out, the angle of the slits L and L' is set at 17 to 90°. Also, by disposing a slide metal piece (slide member) in the hole 2 which has been provided with the slits L and L', the connecting rod is formed. In this case, the slide member is preferably mounted in the hole such that the tightness of the slide member which is defined by the difference between the outer peripheral length thereof and the inner peripheral length of the hole, is made to be 0.05 mm or greater.

Figure 10A:
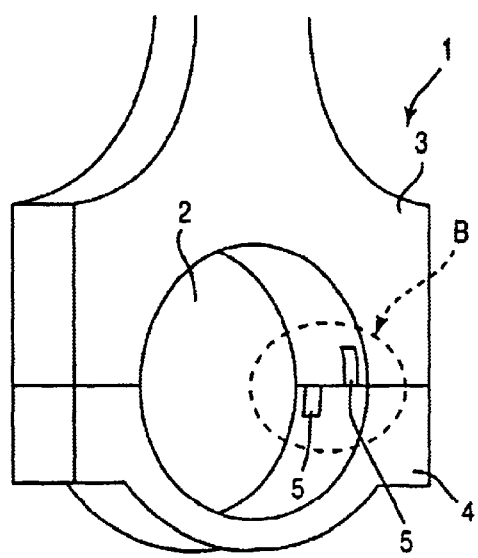
FIG. 10A is a perspective view of the large end.
Figure 10B:
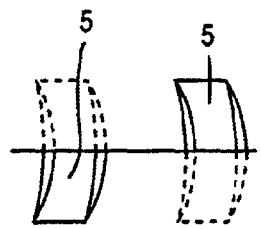
FIG. 10B is a greatly enlarged view of the portion indicated with the arrow B in FIG. 10A.

The slide metal piece is generally mounted on the large end, but the present invention may be applied by disposing the slide metal piece at only the small end, or at both the large end and the small end. Furthermore, in the present invention, in the case where the nail of the slide metal piece does not abut an end surface of the rod portion or the like, the effect of the nail is fully exhibited. However, the structure in which the nail of the slide metal piece abuts the rod portion and the like (see FIG. 10A) may also be applied. In that case, the relative slippage of the slide metal piece with respect to the hole at the time when the large end is deformed due to the load exerted on the connecting rod decreases, and thus the generation of fretting can be controlled.

EXAMPLES

Figure 2:
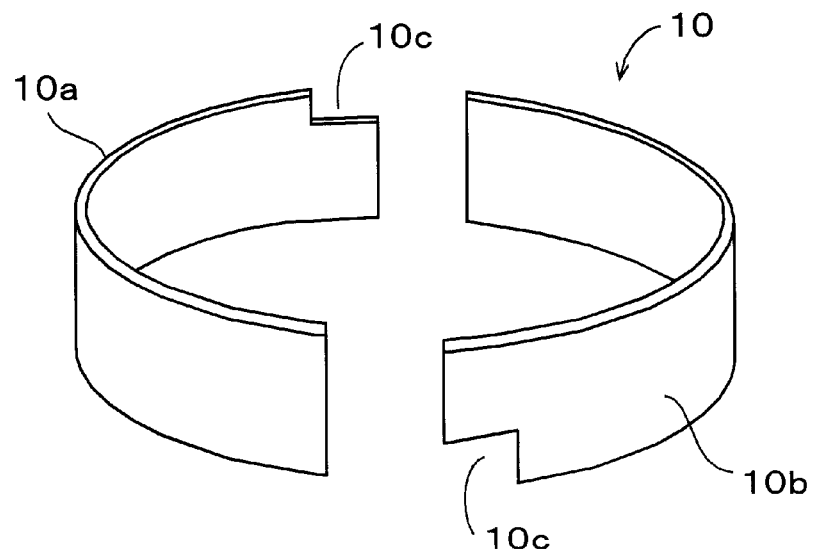
FIG. 2 is perspective view of a slide metal piece formed in the example of the present invention.

Next, the present invention will be described in further detail using concrete examples. FIG. 2 is a perspective view of the slide metal piece (slide member) 10 of the example, which is formed for measuring slip torque of the slide metal piece with respect to the hole of the large end. The ring slide metal piece of the example is formed in the same manner as the actual slide metal piece, except that a notch 10c for engagement with the torque meter jig is formed at the end of the ring halves 10a and 10b. As the slide metal piece 10, an SP material whose outer peripheral surface was plated with Ni, whose inner peripheral surface was plated with Pb—Sn—Cu and whose entire surface was subsequently flush plated with Sn was used.

Figure 3A:
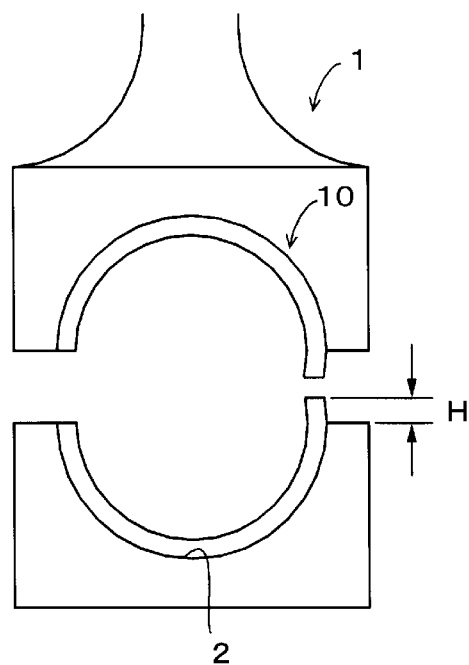
FIG. 3A is side view showing a state in which the slide metal piece is mounted in the rod portion and the cap portion.
Figure 3B:
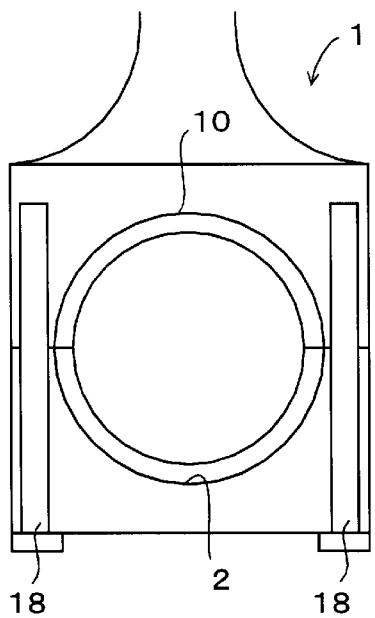
FIG. 3B shows a state in which the rod portion and the cap portion are bolted.

FIG. 3 shows the steps for mounting the slide metal piece 10 in the large end 1 of the connecting rod. The outer diameter of the slide metal piece 10 is set so as to be larger than the inner diameter of the hole 2 of the large end 1. As a result, as shown in FIG. 3A in which no load is applied, the large end 1 protrudes by the amount of the crush height. When the bolts 18 are tightened in this state, the slide metal piece 10 elastically deforms as shown in FIG. 3B and the large end 1 is in the hole 2 in a state in which it is pressure-inserted. Also, the tightness is a value obtained by subtracting the inner peripheral length of the hole 2 from the outer peripheral length of the slide metal piece 10. The connecting rod main body portion is one formed by forging an FC-0205 sintered member and dividing the large end 1 so as to be split in the longitudinal direction thereof.

Figure 4:
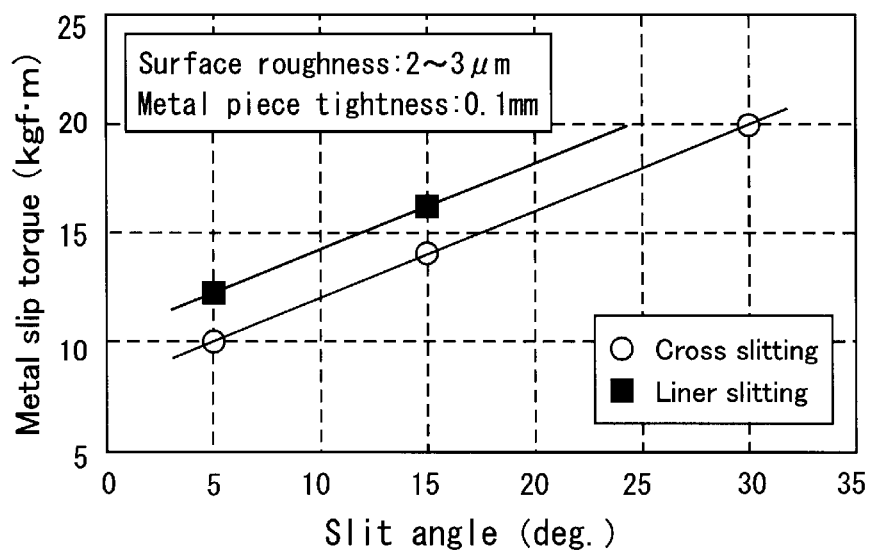
FIG. 4 is a diagram showing the relationship between the angle of the slits in the circumferential direction and the metal piece slip torque.

The tightness of the slide metal piece 10 was set to 0.1 mm and the surface roughness (Ry) of the hole 2 of the large end 1 was set to 2 to 3 $\mu$m. The angle of the slits in the circumferential direction was then changed and the slip torque was measured. The results are shown in FIG. 4. It is to be noted that in the state of FIG. 3B, the torque meter jig is engaged with the notch 10c of the slide metal piece 10, and torque is applied to the jig. The torque when the slide metal piece 10 rotates relative to the hole 2 is referred to as the slip torque. As shown in FIG. 4 when the slit angle is varied between 5° and 30°, the slip torque increases as the slit angle increases. Furthermore, it can be seen that in the case of linear slitting, when the slit angle is no less than 13°, the slip torque is 15 kgf·m, and in the case of cross slitting, when the slit angle is no less than 17°, the slip torque is 15 kgf·m.

Figure 5:
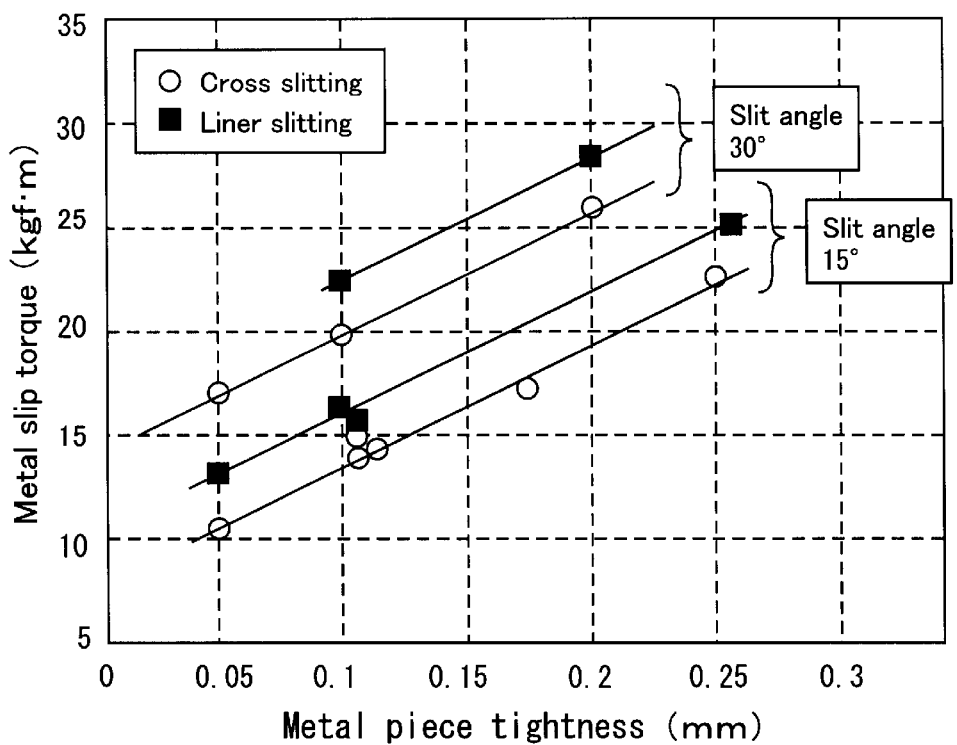
FIG. 5 is a diagram showing the relationship between the tightness of the slide metal piece and the metal piece slip torque.

Next, the surface roughness (Ry) of the hole 2 of the large end 1 was set to 2 to 3 $\mu$m and the slit angle was set to be 15° and 30°. The tightness of the slide metal piece 10 was varied and the slip torque was measured. The results are shown in FIG. 5. As can be seen from FIG. 5, even when the tightness of the slide metal piece was the same, the slip torque was changed by the slit angle. That is to say, in the case where the slit angle is 30°, in the case of both linear slitting and cross slitting, as long as the tightness is no less than 0.05 mm, the slip torque will be not be less than 15 kgf·m. Also, in the case where the slit angle was 15° and the slitting was linear, if the tightness is no less than 0.07 mm, the slip torque will be no be less than 15 kgf·m.

Figure 6:
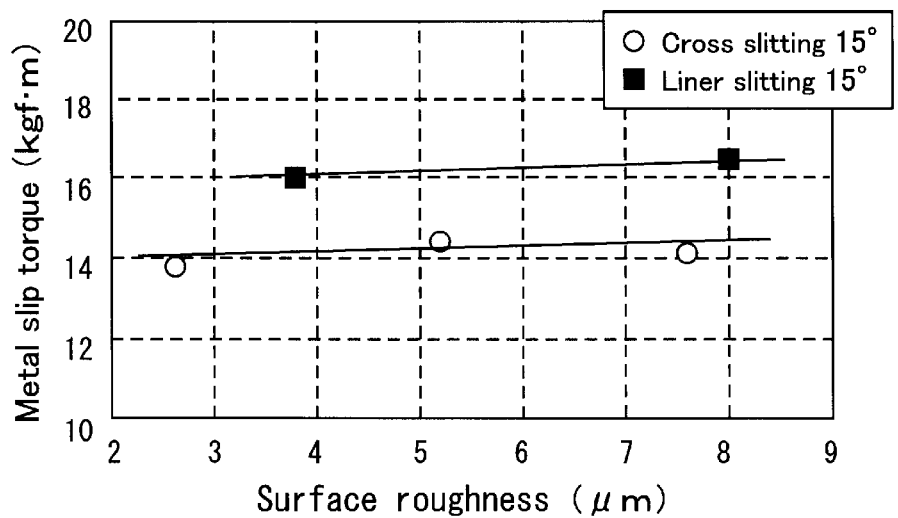
FIG. 6 is a diagram showing the relationship between the surface roughness of the inner peripheral surface of the large end and the metal piece slip torque.

Next, the tightness of the slide metal piece 10 was set to be 0.1 mm and also the slit angle was set to 15°. The surface roughness (Ry) of the inner peripheral portion of the hole 2 of the large end 1 was changed and the slip torque was measured. The results are shown in FIG. 6. As shown in FIG. 6, as the surface roughness increases, there is a tendency for the slip torque to increase, but it can be seen that the effect of surface roughness is limited. Thus, a surface roughness of the inner peripheral portion of the hole 2 of 2 $\mu$m can be considered to be sufficient.

Figure 7:
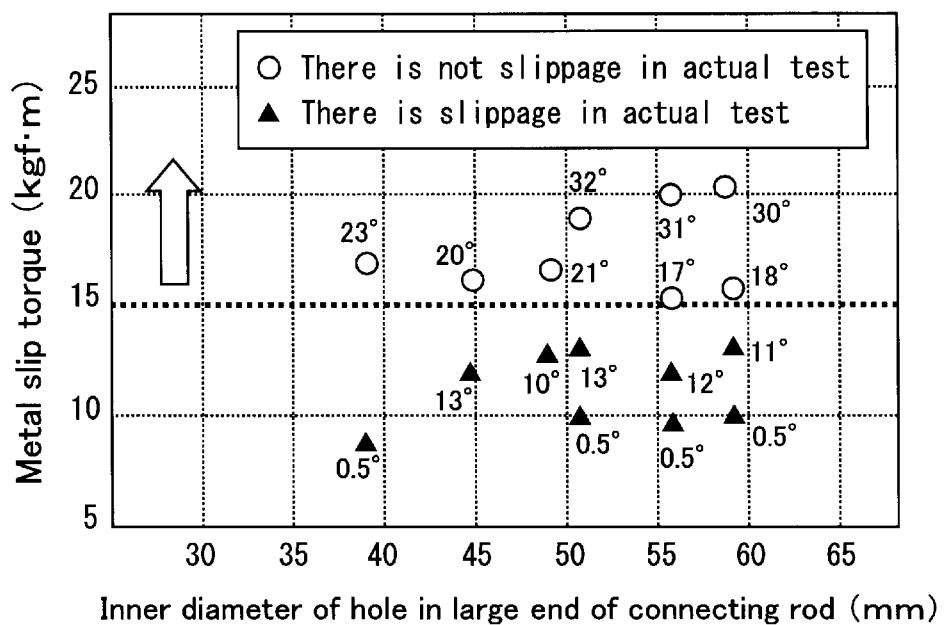
FIG. 7 is a diagram showing the relationship between the inner diameter of the large end and the slit angle, and the metal piece slip torque.
Figure 11A:
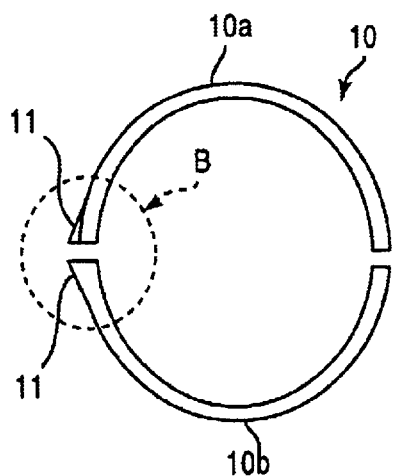
FIG. 11A is a side view of the slide metal piece.
Figure 11B:
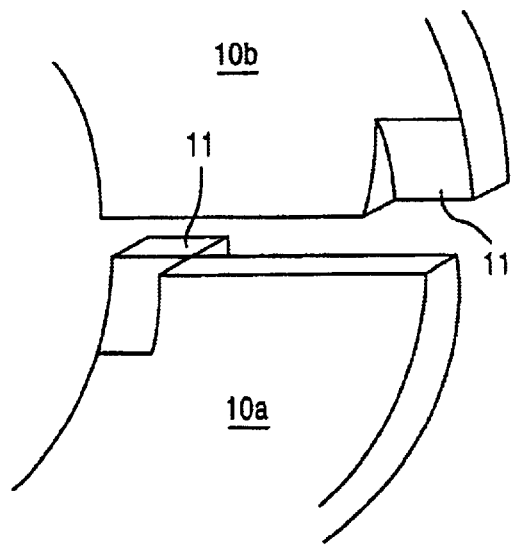
FIG. 11B is a greatly enlarged view of the portion indicated by the arrow B in FIG. 11A.
Figure 12A:
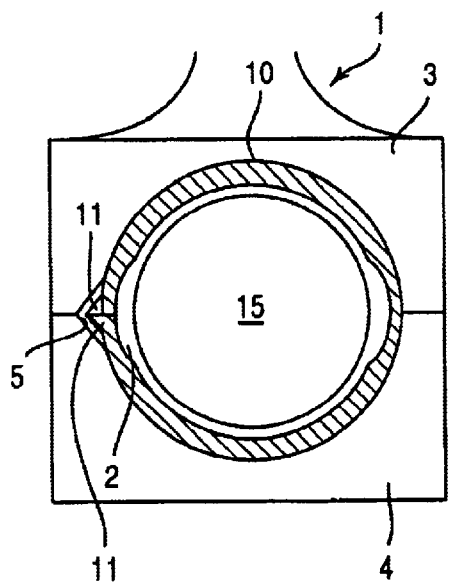
FIG. 12A is a side view of the connecting rod.
Figure 12B:
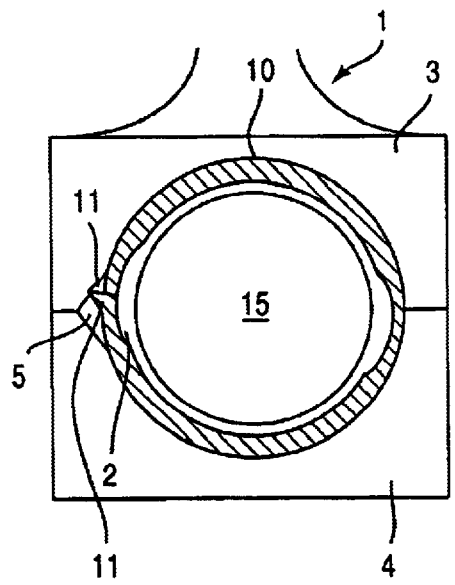
FIG. 12B is a side view showing the state in which the slide metal piece has been rotated from the state shown in FIG. 12A.
Figure 14A:
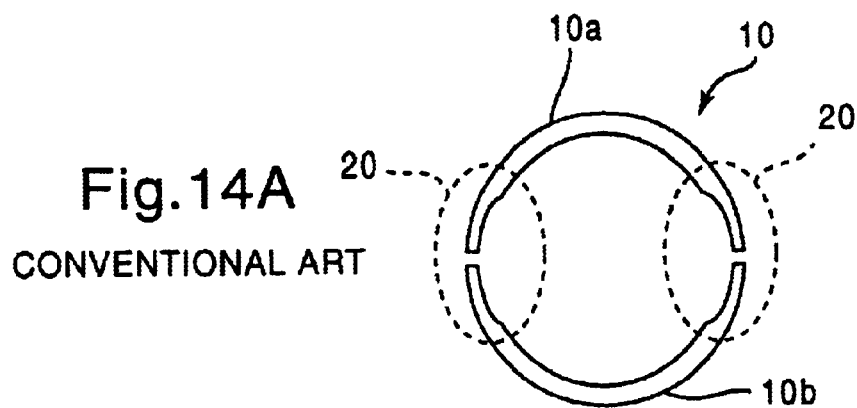
FIG. 14A a side view of the slide metal piece for explaining crush relief.
Figure 14B:
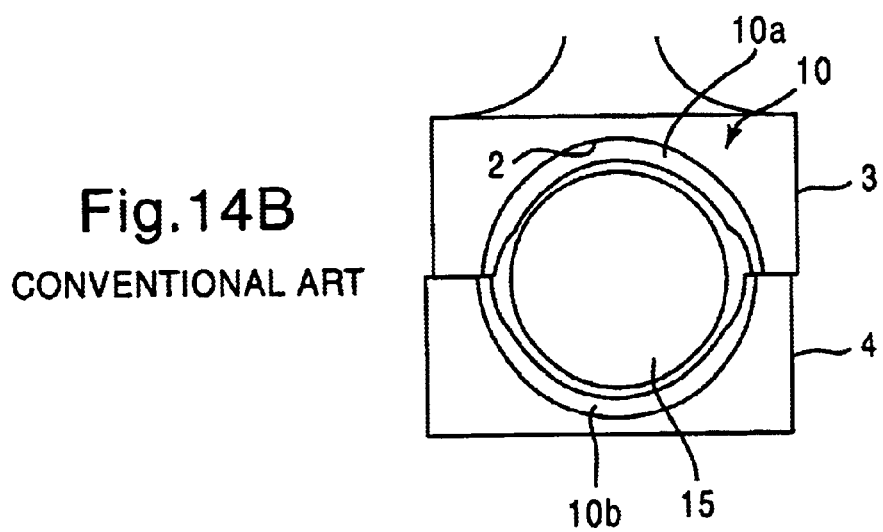
FIG. 14B is a side view showing the connecting rod which is slid at the joint surface.
Figure 14C:
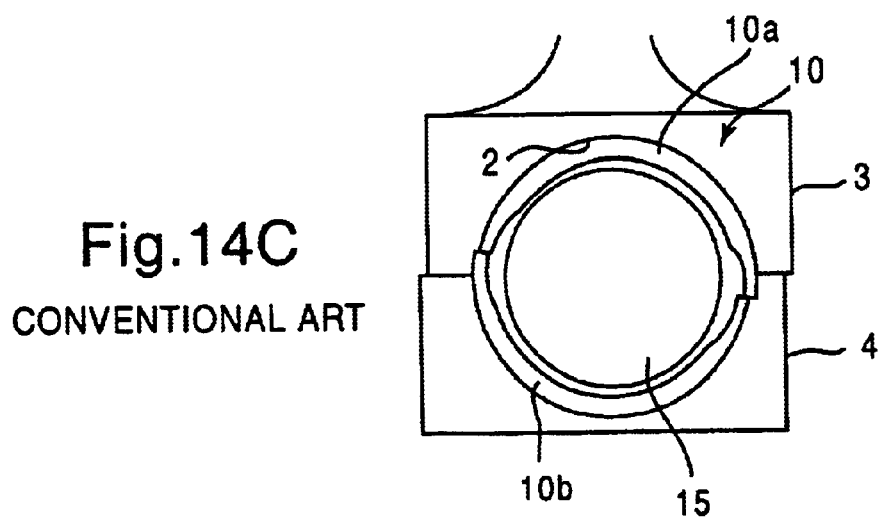
FIG. 14C is a side view of the connecting rod whose slide metal piece has been rotated.

Next, the tightness of the slide metal piece 10 was set to 0.1 mm, the surface roughness (Ry) of the hole 2 of the large end 1 was set to 2 to 3 $\mu$m, and various slit angles were set and cross slitting was carried out. The inner diameter of the hole 2 of the large end 1 was changed and the slip torque was measured. The slide metal piece used for measuring was formed in the same manner as that shown in FIG. 11, and the connecting rod was formed with this slide metal piece. The actual testing was then carried out. These results are shown in FIG. 7. As can be seen from FIG. 7, the internal diameter of the hole 2 has no effect on the slip torque. Furthermore, it was confirmed that as long as the slip torque is no less than 15 kgf·m, the slide metal piece was not slid in the actual test.

The above results confirm that in the case of linear slitting, when the slit angle is set to be 13 to 90°, and in the case of cross slitting, when the slit angle is set to be 17 to 90°, slippage of the slide metal piece is not caused. Furthermore, the tightness of the slide metal piece is to be appropriately set in accordance with the slit angle such that the slip torque is greater than or equal to 15 kgf·m. For example, in the case where the slit angle is 30°, it is sufficient for the tightness of the slide metal piece to be 0.05 mm or more, and in the case where the slit angle is 15° and slitting is linear, the tightness should be 0.07 mm or more. Furthermore, as shown from the results of FIG. 4 in the case of linear slitting when the slit angle is 13°, and in the case of cross slitting when the slit angle is 17°, it is sufficient for the slide metal piece tightness 0.1 mm or more. From the above, the range for the tightness of the slide metal piece is preferably to 0.05 mm or greater, more preferably 0.07 mm or greater, and even more preferably, 0.1 mm or greater.

Figure 8:
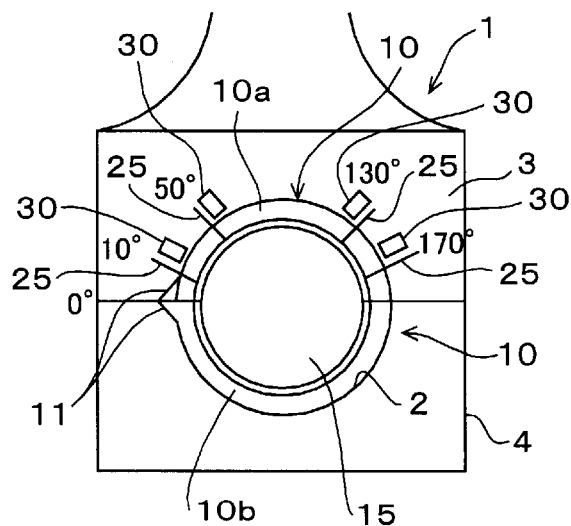
FIG. 8 is a side view of a connecting rod for showing a method for measuring the relative slippage amount of the slide metal piece.

Next, a slide metal piece the same as that of the actual test above, and in which the slit angles are 17° (cross slitting) was used, and as shown in FIG. 8, the relative slippage was measured. As shown in FIG. 8, the slide metal piece 10 was mounted in the large end 1 and a crank pin 15 was fit into the slide metal piece 10. In addition, the mating surface at the left side of the ring halves 10a and 10b which form the slide metal piece 10 was used as a reference position, and from this reference position, the ring half 10a was moved in a clockwise direction, and a target plate 25 which extends in the radial direction was fixed to the 10°, 50°, 130°, and 170° positions, respectively. Furthermore, a distance sensor 30 which causes the detecting portion to approach the target plate 25, was mounted on the rod portion 3 of the large end 1. In this state, a load of approximately 2000 kgf was applied to the crank pin 15 and the connecting rod, and both were deformed so as to be pulled apart in the vertical direction in the figure. At the position of the distance sensor 30 shown in FIG. 8, when relative slippage of the outer peripheral surface of the slide metal piece 10 with respect to the inner peripheral surface of the hole 2 of the large end 1 is caused, the target plate 25 moves away from the distance sensor 30. The amount of movement was then measured as relative slippage. Also, for the sake of comparison, a slide metal piece which was the same as that used in the actual test except that the slit angle was 0.5° and the slitting was linear, was used and relative slippage was measured under the same conditions as described above. The results are shown in FIG. 9.

Figure 9:
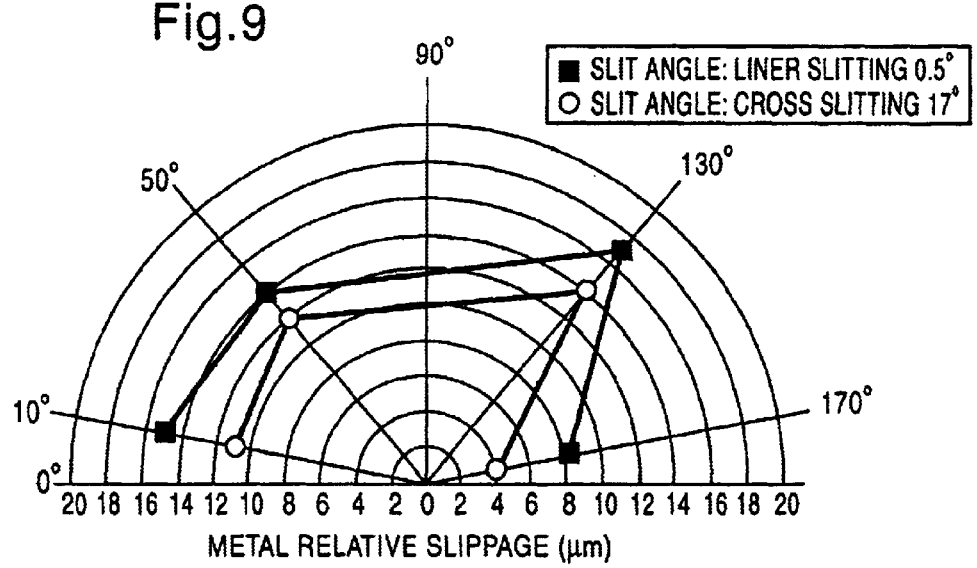
FIG. 9 is a diagram showing the relative slippage amount at respective angle positions of the slide metal piece.

As shown in FIG. 9, in the connecting rod in which a slide metal piece having a slit angle of 17° was mounted, the relative slippage was at most, 4 μm less than that in which the slit angle of the slide metal piece mounted was 0.50°. From this it can be seen that the present invention is effective in preventing rotation of the slide metal piece, and in restricting relative slippage.

As described above, in the present invention, by providing slits in a circumferential direction at a fixed angle on the inner peripheral surface of the hole of the connecting rod, rotation and relative slippage of the slide metal piece is restricted, and thus the effect is obtained of eliminating problems such as damage and heating up of the nail of the slide metal piece and generation of fretting and the like.

What is claimed is:

1. An internal combustion engine connecting rod comprising a hole in an end of the connecting rod main body, the end being divided into a plurality of parts which are in a circumferential direction with respect to the hole, and a slide member composed of a pair of ring halves is disposed on an inner peripheral surface of the hole, wherein the inner peripheral surface of the hole is provided with machining marks extending in one direction at an angle of 13 to 90° with respect to the circumferential direction, and the slide member is mounted into the hole with a tightness defined by difference between outer circumferential length of the slide member and inner circumferential length the hole of no less than 0.1 mm, whereby the slip torque necessary for causing relative rotation of the slide member and the hole is no less than 15 kgf·m when the slide member is mounted into the hole and a force causing relative rotation of the slide member and the hole is applied thereto.

2. The internal combustion engine connecting rod of claim 1, wherein the angle of the machining marks with respect to the circumferential direction is no more than 35°.

3. The internal combustion engine connecting rod of claim 2, wherein the hole has an inner peripheral portion with a surface roughness (Ry) of 2 to 3 μm.

4. An internal combustion engine connecting rod comprising a hole in an end of the connecting rod main body, the end being divided into a plurality of parts which are in a circumferential direction with respect to the hole, and a slide member composed of a pair of ring halves is disposed on an inner peripheral surface of the hole, wherein the inner peripheral surface of the hole is provided with machining mark extending in one direction at an angle of 17 to 90° with respect to the circumferential direction, and machining marks that extend in a direction crossing the one direction, and the slide member is mounted into the hole with a tightness defined by difference between outer circumferential length of the slide member and inner circumferential length of the hole of no less than 0.1 mm, whereby the slip torque necessary for causing relative rotation of the slide member and the hole is no less than 15 kgf·m when the slide member is mounted into the hole and a force causing relative rotation of the slide member and the hole is applied thereto.

5. The internal combustion engine connecting rod of claim 4, wherein the angle of the machining marks with respect to the circumferential direction is no more than 35°.

6. The internal combustion engine connecting rod of claim 5, wherein the hole has an inner peripheral portion with a surface roughness (Ry) of 2 to 3 μm.

* * * * *

UNITED STATES PATENT AND TRADEMARK OFFICE
CERTIFICATE OF CORRECTION

PATENT NO.     : 6,637,400 B2
DATED          : October 28, 2003
INVENTOR(S)    : Iida et al.

It is certified that error appears in the above-identified patent and that said Letters Patent is hereby corrected as shown below:

<u>Title page,</u>
Please add Item:
-- [30] Foreign Application Priority Data
Aug. 3, 2000 (JP)      2000-235599 --

Signed and Sealed this

Second Day of March, 2004

JON W. DUDAS
*Acting Director of the United States Patent and Trademark Office*